Nov. 6, 1956  J. CZUCH  2,769,322
EAR RING WITH BALL JOINT FOR SPACING CLAMPING
FACE FROM CLAMPING ARM
Filed July 26, 1955
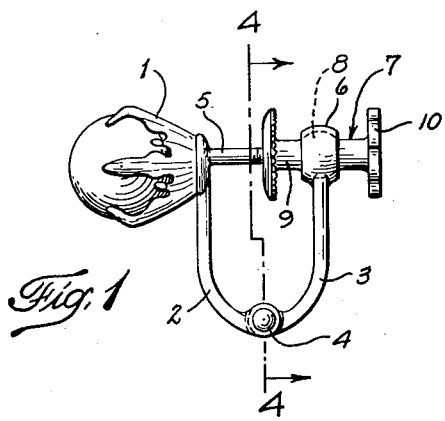
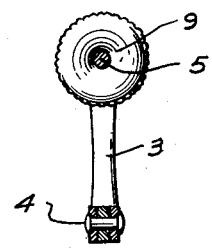
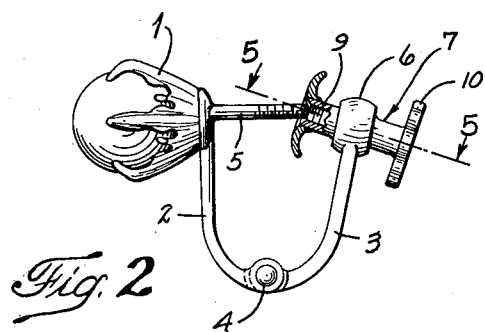
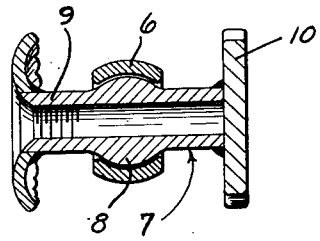
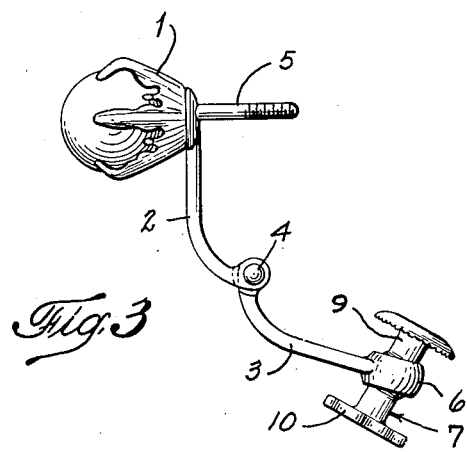
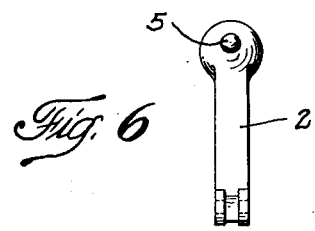
INVENTOR.
JACK CZUCH
BY
Morgan, Finnegan, Durham & Pine
ATTORNEYS.

United States Patent Office 2,769,322
Patented Nov. 6, 1956

2,769,322

EAR RING WITH BALL JOINT FOR SPACING CLAMPING FACE FROM CLAMPING ARM

Jack Czuch, Brooklyn, N. Y.

Application July 26, 1955, Serial No. 524,423

2 Claims. (Cl. 63—12)

This invention relates to ear rings, and especially to such ear rings adapted to pierce the ear lobe, and more especially to such ear rings having fastening means in a relatively concealed position directly adjacent to the ear lobe.

Piercing type ear rings are usually composed of a setting mounted in connection with a threaded shank and nut. The threaded shank is inserted in the hole in the ear, and the nut applies a clamp-like pressure on the ear lobe when tightened on the threaded shank. However, because of the small dimensions of the parts necessary to preserve a pleasing appearance and the restricted space available for manipulation behind the ear lobe, the fastening operation with such ear rings frequently involves difficulty and discomfort. Alignment of the nut and threaded shank is many times hit or miss. Alternatively, if the operating parts are removed from behind the ear lobe to facilitate ease in fastening, the pleasing appearance of the ear ring ensemble is unfavorably affected.

Speaking generally the present invention provides an ear ring which can be fastened with substantially no fumbling or discomfort. Exact alignment and positioning of the parts for fastening is accomplished with great certainty. Further, the fastening means are positioned behind the ear lobe so that a pleasing appearance is retained.

Briefly, this is accomplished by providing two arms hinged together at their lower ends for movement toward and away from each other in a common plane. The ear ring setting is mounted on the moveable end of one of the arms so as to face outwardly. A threaded post for piercing of the ear is mounted on the moveable end of this arm facing inwardly, and lies in the plane of the arms. A link member is pivotally mounted on the moveable end of the other or second arm. The free end of the link member extends inwardly and laterally toward the threaded post and terminates in a nut threaded for engagement with the post.

Preferably the mounting of the link on the second arm is a ball and socket mounting or a swivel mounting. More preferably the nut is formed with a funnel flare to guide and assure engagement with the post.

The accompanying drawings illustrate a preferred form of the invention. In these drawings:

Fig. 1 is a side elevation of an illustrative embodiment of the ear ring in the completely closed or fastened position.

Fig. 2 is a side elevation of the ear ring of Fig. 1 showing the ear ring in partially closed position at the moment of first contact between the post and nut.

Fig. 3 is similar to Fig. 1 also but shows the ear ring in the open position.

Fig. 4 is a front elevation, partly in section, on the line 4—4 of Fig. 1.

Fig. 5 is an enlarged section on the line 5—5 of Fig. 2.

Fig. 6 is a front elevation of the arm carrying the setting.

Referring in detail to the illustrative embodiment of the invention shown by way of example in the drawings, the number 1 designates the setting for a stone, gem or the like. Two curved tubular arms 2 and 3 are attached at their lower ends by a hinge 4 for movement on the hinge toward and away from each other in a common plane. Arms 2, 3 swing from the open position of Fig. 2 and from the intermediate position of Fig. 2 and the closed position of Fig. 1.

The setting 1, or any kind of ornament, is carried on the moveable end of arm 2 and faces outwardly, i. e., carried on the convex side of arms 2 in the embodiment of the invention illustrated. A threaded post 5 is fixedly mounted on the moveable end of arm 2 and faces inwardly at approximately a right angle to the adjacent portion of arm 2. Post 5 lies in the plane of arms 2, 3. The moveable end of arm 3 is formed as a socket 6.

A link 7 has a ball portion 8 which fits within socket 6. The body of link 7 extends inwardly toward the threaded post 5 and its inwardly extending free end is internally threaded to form a nut portion 9 for engaging the free end of post 5. Socket 6 is formed internally with an opening facing laterally of the adjacent portion of arm 3 to accommodate the body of link 7 but of a size slightly greater than the diameter of link 7 (see Fig. 5). Link 7 thereby swivels on arm 3, and nut portion 9 is capable of limited independent vertical movement with respect to the moveable end of arm 3. (Compare the position of nut 9 relative to arm 3 in Figs. 1 and 2.)

The nut portion 9 of link 7 is formed as a funnel flare having cam surfaces inclined radially inwardly and rearwardly toward the nut aperture.

As shown in the preferred embodiment of the drawings, the link 7 has an outward portion extending through the socket on the convex side of arm 3 ending in a finger-piece 10.

In the fastening operation of the ear ring, arms 2 and 3 are moved to the open position of Fig. 3. Post 5 is then inserted through the pierced hole in the ear so that the lobe fits over and around the unthreaded portion of the post 5. Thereafter arm 3 is moved by the wearer toward arm 2 so that arms 2, 3 assume the posture of the usual bow. Since arms 2 and 3 are hinged for movement in a common plane, the nut portion 9 of link 7 is aligned horizontally with respect to threaded post 5. Closure movement of arms 2, 3 toward one another will result in a contact between nut portion 9 and threaded post 5 and the camming of the free end of post 5 on the face of the funnel flare of nut portion 9 into the nut aperture. See Fig. 2. At this point link 7 does not lie on a common axis with post 5, link 7 having swivelled on the ball and socket joint so that nut portion 9 moved upwardly with respect to the free end of arm 3 into vertical alignment with the free end of post 5. The wearer then turns finger-piece 10 to tighten nut 9 on post 5, the resilient nature of the tubular parts permitting the bending necessary for threading engagement of the nut and post. As the nut tightening proceeds, link 7 swivels on the ball and the socket joint and the nut portion 9 moves downwardly with respect to the free end of arm 3 until link 7 lies on the same axis as post 5. The ear ring is then in closed position, Fig. 1, securely fastened on the ear lobe, and the threaded post 5, nut 9, link 7, and the finger-piece 10 are concealed behind the ear lobe.

Alternatively, link 7 can be mounted for more complete pivotal movement, as with an ordinary hinge construction, but the embodiment illustrated is preferred since it assures contact between the nut and post with the ear ring in the intermediate position.

The word "setting" is meant to include any form of ornament, in addition to the setting described and illustrated.

It will be understood that the present invention is not limited to the details above and shown in the drawings, except as appears hereafter in the claims.

I claim:

1. An ear ring comprising two arms hinged together at their lower ends for movement in a common plane, a setting mounted on the movable end of one of said arms and facing outwardly, a threaded post fixedly mounted on said movable end and extending inwardly and laterally of the arm and lying in the same plane as said arms, a link pivotally mounted on the movable end of the second of said arms by means of a ball and socket and extending inwardly and outwardly therefrom, the free inward end of said link terminating in a nut threaded for engagement with said post, and the free outward end of said link terminating in a finger-piece, the nut and finger-piece being held spaced from said second arm by said ball and socket.

2. The subject matter of claim 1 characterized by the fact that the nut portion of the link has a funnel flare with cam faces inclined inwardly and rearwardly to assist engagement of the nut and post.

References Cited in the file of this patent

UNITED STATES PATENTS

| | | |
|---|---|---|
| 111,621 | Dreyfus | Feb. 7, 1871 |
| 271,122 | Riley | Jan. 23, 1883 |
| 986,451 | Franks | May 14, 1911 |

FOREIGN PATENTS

| | | |
|---|---|---|
| 587,425 | France | Apr. 17, 1925 |